United States Patent [19]
Reuter

[11] 3,740,667
[45] June 19, 1973

[54] VARIABLE RELAXATION OSCILLATOR HAVING TIME CONSTANT CIRCUIT DEPENDENT ON POWER SUPPLY VARIATIONS

[75] Inventor: Fritz Reuter, Esslingen, Neckar, Germany

[73] Assignee: J. Eberspacher, Esslingen, Neckar, Germany

[22] Filed: July 3, 1972

[21] Appl. No.: 268,714

Related U.S. Application Data

[63] Continuation-in-part of Ser. No. 71,192, Sept. 10, 1970, abandoned.

[52] U.S. Cl. .............. 331/111, 307/228, 307/261, 307/271, 307/294
[51] Int. Cl. .............................................. H03k 3/281
[58] Field of Search .................. 331/111; 307/261, 307/294, 228, 271

[56] References Cited

UNITED STATES PATENTS

| | | | |
|---|---|---|---|
| 2,979,626 | 4/1961 | Pinckaers | 331/111 |
| 3,101,433 | 8/1963 | Miller et al. | 331/111 X |
| 3,105,160 | 9/1963 | Adler | 307/294 X |
| 3,158,822 | 11/1964 | Brechling | 331/111 |
| 3,227,942 | 1/1966 | Bunch et al. | 307/271 X |
| 3,593,197 | 7/1971 | Carreras | 331/111 |
| 3,670,266 | 6/1972 | Meux | 331/111 X |

*Primary Examiner*—John S. Heyman
*Attorney*—David Toren, Bernard X. McGeady and Leo Stanger

[57] ABSTRACT

An electronic switching arrangement for an electronic pulse generator, has a condenser and a resistor as pulse frequency determining members, the condenser and the resistor being controlled by an active electronic element such as a first transistor. A series connection of a second transistor and a second resistor is connected in parallel with the time determining resistor associated with the first transistor and the pulse generator. A Zener diode is connected to the base of the second transistor to provide a predetermined voltage-dependent control of the second transistor.

10 Claims, 1 Drawing Figure

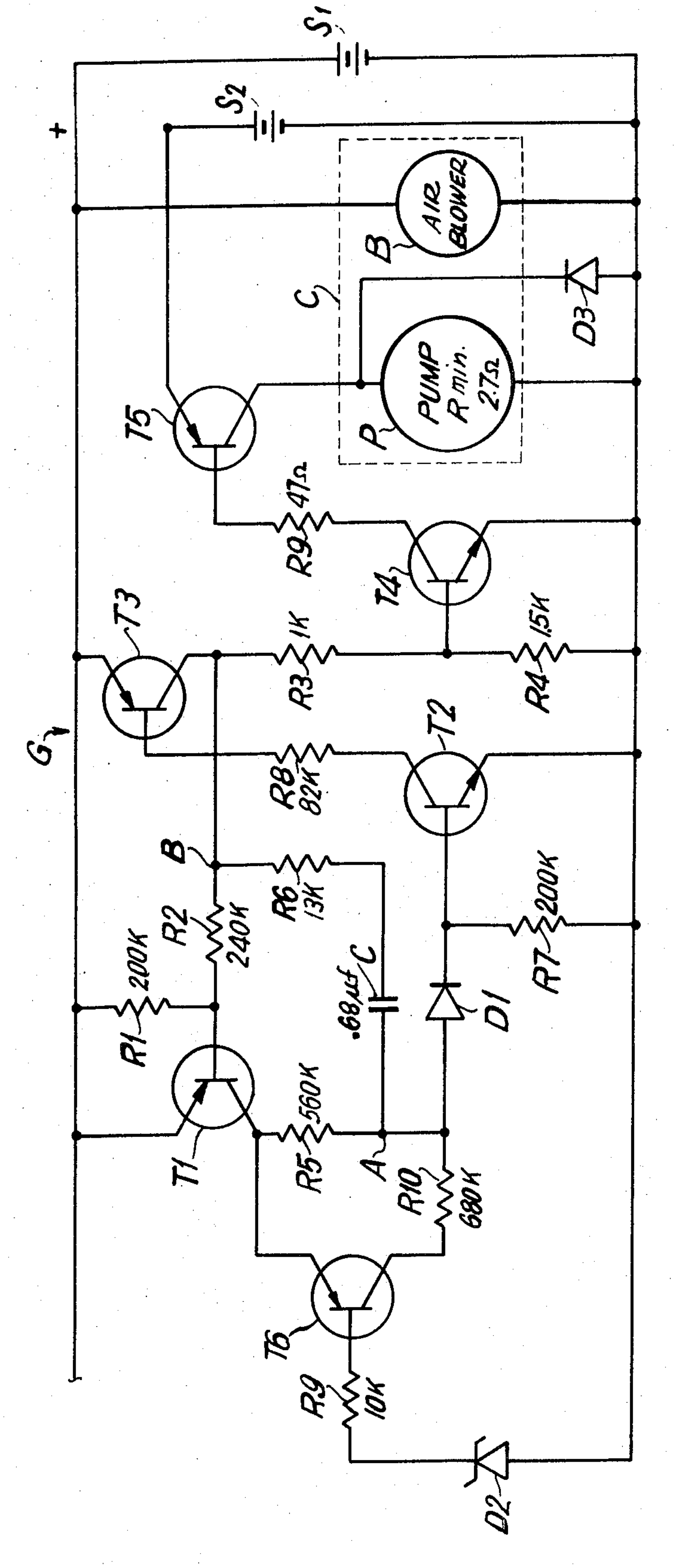
S1
S2
+
AIR BLOWER
B
C
D3
PUMP R min. 2.7Ω
P
T5
R9 47Ω
T4
T3
R3 1K
R4 1.5K
G
R8 82K
T2
B
R6 13K
R2 240K
R1 200K
C .68μf
D1
R7 200K
T1
R5 560K
A
R10 680K
T6
R9 10K
D2

VARIABLE RELAXATION OSCILLATOR HAVING TIME CONSTANT CIRCUIT DEPENDENT ON POWER SUPPLY VARIATIONS

REFERENCE TO CO-PENDING APPLICATION

This is a Continuation-in-Part of my co-pending Application Ser. No. 71,192 filed Sept. 10, 1970 for "Electronic Switching Arrangement", and assigned to the same Assignee as the present Application.

BACKGROUND OF THE INVENTION

Pulse generators are used, for example, for the operation of fuel pumps in motor vehicles. In arrangements of this kind, it is essential that the amount of fuel to be supplied by the fuel pump be controlled, with relation to the optimum requirement, between a very small amount and a relatively large amount.

To date, such control has been effected mostly mechanically, and not electronically. In the known arrangements, control has been effected by mechanical changeover switches whose contacts are subject to considerable wear in the control operation. A further disadvantage of the known mechanical arrangements is that switching is inaccurate since bimetal strips, or magnets, are used as switch elements. An additional disadvantage is that there is a considerable switch hysteresis in such changeover switches. Susceptibility to disturbances, in the known arrangements, also is greater since the open contacts are easily soiled or oxidized.

SUMMARY OF THE INVENTION

This invention relates to electronic switching arrangements with frequency determining members comprising condenser-resistor combinations controlled by active electronic elements and, more particularly, to such an arrangement including a pulse generator which, when a certain pre-selected voltage is either exceeded or not attained during operation, changes its pulse frequency.

The present invention is based on the state of the art, in which electrical switching arrangements are known, and consist of resistor-condenser combinations or members. In such arrangements, the resistor-condenser combinations or members, sometimes known as RC members, provide the time constant for the pulse frequency. By changing one of the two values, capacitance or resistance, the pulse frequency is changed.

To solve this problem, the present invention provides an electronic switching arrangement with frequency determining members consisting of condensers and resistors controlled by active electronic elements. The invention is characterized in that a series connection of a resistor and a transistor is connected in parallel with a time determining resistor of an electronic pulse generator. A Zener diode is connected to the base of this transistor to provide a predetermined voltage dependent control thereof.

In the following example, the construction and operation of the electronic switching arrangement, as well as the advantages obtained, will be described. A combustion system has been chosen as an example of the application of the invention, and comprises a combustion air blower in which the speed of the blower motor depends on a battery voltage. Consequently, the volume of air supplied to the combustion system also depends on the battery voltage.

In an arrangement of this kind, it is important that the amount of fuel sprayed in is exactly the amount required according to the stoichiometrical relation. This is possible only if a reduced amount of fuel is sprayed in immediately upon any reduction in the amount of combustion air supplied, caused by the lower battery voltage and the consequently lower speed of the motor. This is attained by a change of pulse frequency for the operation of the fuel pump supplying fuel to the combustion chamber, the change corresponding to changes in the volume or rate of supply of the combustion air. It is only in this manner, moreover, that a carbon and soot free combustion can be attained.

An object of the invention is to provide an improved electronic switching arrangement for a pulse generator.

Another object of the invention is to provide such an electronic switching arrangement of the type including condenser-resistor combinations, controlled by active electronic elements, as frequency determining members.

A further object of the invention is to provide such an arrangement including a frequency determining member connected to a source of potential and in controlling relation to the pulse generator, and including a time-determining resistor.

Another object of the invention is to provide such an arrangement in which a series connection of a resistor and a transistor is connected in parallel with the time determining resistor.

A further object of the invention is to provide such an arrangement in which, for the predetermined voltage-dependent control of the transistor in the series connection, a Zener diode is connected to the base of this transistor.

For an understanding of the principles of the invention, reference is made to the following description of a typical embodiment thereof as illustrated in the accompanying drawing.

BRIEF DESCRIPTION OF THE DRAWING

In the drawing:

The singe FIGURE is a schematic wiring diaphragm of an electronic switching arrangement embodying the invention.

DESCRIPTION OF PREFERRED EMBODIMENTS

In the drawing, a battery source $S_1$ energizes a combustion air blower B in a combustion chamber C. The speed of the blower depends upon the battery voltage of the source $S_1$. Consequently the volume of air supplied to the combustion chamber also depends upon the voltage of the battery source $S_1$.

A pulse generator G pulses a fuel pump P in the chamber C at a rate which determines the amount of fuel sprayed into the chamber and which is exactly the amount required according to the stoichiometrical relation. Since the volume of the air supplied to the combustion chamber by the blower B depends upon the battery voltage, the generator G changes the pulse frequency of the operation of the pump P supplying fuel to the combustion chamber in response to the change in the battery voltage. Thus the pump reduces the amount of fuel sprayed into the chamber C immediately upon any reduction in the amount of combustion air supplied by the blower B as a result of the lowered voltage of the battery source $S_1$. In this way a carbon and soot free combustion is attained.

In the generator G, a small current flows through a voltage divider composed of resistors $R_1$, $R_2$, $R_3$, and $R_4$ as soon as the voltage of the battery source $S_1$ is applied. The values of the resistors are shown on the drawing. These values represent the values for one embodiment of the invention, and thus should be taken only as an example. The base voltage at a transistor $T_3$ keeps the transistor off. The voltage across the resistor $R_1$ in the voltage divider biases the transistor $T_1$ on. The emitter-collector current through the transistor $T_1$ follows a path through a resistor $R_5$, past a point A, through a capacitor C, through a resistor $R_6$, to a potential point B between the resistors $R_2$ and $R_3$ of the voltage divider. The load current of the transistor $T_1$ thus charges the capacitor C. This increases the positive voltage at point A until it is large enough to produce a current through a diode $D_1$, a resistor $R_7$ and the base emitter junction of the transistor $T_2$. This turns on the transistor $T_2$. The threshold value of the potential at the point A for turning on the transistor $T_2$ is determined by the potential drop of the diode $D_1$ and the base-emitter voltage of the transistor $T_2$.

Conduction through the emitter-collector circuit of transistor $T_2$ results in turning on transistor $T_3$ through a resistor $R_8$. The potential point B at the collector of transistor $T_3$, which was previously at a comparatively low potential, now rises virtually to the positive potential of the source $S_1$. The capacitor now changes its charge through the diode $D_1$ and the base emitter junction of transistor $T_2$ as well as the resistor $R_7$ with a current value that is limited by the resistor $R_6$.

The positive voltage at the point B turns off the transistor $T_1$. The change in charge of capacitor C occurring through the conducting transistor $T_3$ shorts out the resistors $R_1$ and $R_2$. This causes a sufficiently high current to flow through the resistors $R_3$ and $R_4$ so that the potential drop across the resistor $R_4$ reaches the base-emitter biasing voltage necessary for turning on a transistor $T_4$. Conduction of the transistor $T_4$ immediately renders a transistor $T_5$ conductive through a resistor $R_9$. This applies a pulse through the pump P. The discharge of capacitor C caused by conduction of the transistor $T_3$ ultimately lowers the voltage at the point A to reduce the base voltage of transistor $T_2$ so that the latter is turned off or blocked. Blocking of transistor $T_2$ results in immediate turn-off of transistor $T_3$. The resistors $R_1$ and $R_2$ are now again placed in series with the resistors $R_3$ and $R_4$. As a result the base voltage of the transistor $T_4$ drops sufficiently low to turn-off transistor $T_4$. The emitter-collector current of the transistor $T_4$ drops to zero and turns off the power transistor $T_5$. The charging process of the capacitor C now begins anew.

The frequency at which the generator G applies pulses to the pump P through the transistor $T_5$ is determined not only by the previously mentioned resistors associated with the capacitor C, for example the resistor $R_5$, but also by a resistor $R_{10}$. Conduction of a transistor $T_6$ connects the resistor $R_{10}$ in parallel with the resistor $R_5$. This produces a significantly smaller time constant RC than is available with the resistor $R_5$ alone.

Conduction of the transistor $T_6$ occurs when the current through a Zener diode $D_2$ is sufficiently high to break down the Zener diode and establish an on-biasing condition at the base of transistor $T_6$. Another way of saying this is that transistor $T_6$ is turned on when the current through the Zener diode $D_2$ is coincident with the base current of the transistor $T_6$. This base current then causes the transistor $T_6$ to switch on; thereby connecting the resistors $R_5$ and $R_{10}$ in parallel. However transistor $T_6$ can be turned on only if the voltage of the battery source $S_1$ is greater than the potential drop across the collector-emitter path of the transistor $T_1$, across the base-emitter path of the transistor $T_6$, and the breakdown voltage of the Zener diode $D_2$, all taken together. The resistance 9 serves as a current limiting resistor for the base current of the transistor $T_6$.

In operation therefore, the generator G supplies continuous pulses to the fuel pump P so that the latter injects fuel into the chamber C. The blower B blows air into the chamber C according to a predetermined desired stoichiometrical relation. When the voltage of battery source $S_1$ is sufficiently high the blower B blows air into the chamber at its normal speed. The parameters of the generator G are set so that when the source $S_1$ exhibits this high voltage the Zener diode $D_2$ turns on the transistor $T_6$ and shunts the resistor $R_{10}$ across the resistor $R_5$. The frequency of the pulse output of the generator G therefore is determined in part by the capacitor C and the two resistors $R_5$ and $R_{10}$ in parallel with each other. Thus the frequency of operation of the generator G is comparatively high.

When the battery source $S_1$ exhibits a drop in voltage the volume of air supplied to the combustion chamber C by the blower B is reduced. At the same time reduction of the voltage at the terminals of the battery source $S_1$ reduces the total voltage applied across the transistor $T_1$, the transistor $T_6$, the resistor $R_9$, and the Zener diode $D_2$. As a result the Zener diode $D_2$ responds by not breaking down and keeping the base of transistor $T_6$ at a comparatively high level. This prevents transistor $T_6$ from turning on so that the resistor $R_{10}$ is no longer in parallel with the resistor $R_5$. At this point the frequency of the generator G is reduced because the time constant RC of the generator is reduced. As a result the fuel pump injects less fuel into the chamber C in concordance with the lowered air volume from the blower B.

The electronic elements, such as Zener diode, are formed in sealed containers so that the entire switching arrangement can be sealed. This technique has the advantage of keeping out environmental influences, such as moisture, corrosive atmosphere, or the like, and thus prevents disturbances to the operation of the device.

The invention may be embodied other than as a combustion system. In the embodiment described, the amount of fuel sprayed is exactly the amount required according to the stoichiometrical relationship. According to the invention a reduced amount of fuel is sprayed in immediately upon any reduction in the amount of combustion air supplied, caused by the lower battery voltage and the consequently lower speed of the motor. This is achieved by a change of pulse frequency for the operation of the fuel pump supplying fuel to the combustion chamber. The change corresponds to the changes in the volume or rate of supply of the combustion air. It produces carbon and soot free combustion.

The invention may also be embodied in other types of pulse generators whose supply voltages are subject to variations, and which require changes in the output frequencies as a result of the changes in the supply voltage. For example the transistor $T_6$ and the resistor $R_{10}$, as well as the Zener diode $D_2$ and the resistor $R_9$ are used, according to other embodiments of the invention, across any frequency determining element in series with a path to a terminal of a source.

That the transistor $T_6$ is connected in series with the transistor $T_1$, which is turned on and off, during operation of the generator G is of particular advantage. The combination of the Zener diode 5 and the transistor $T_6$ thus responds not only to the changes in the voltage across the terminals of the battery supply $S_1$, but also to the conductive state of the transistor. That is to say when the transistor $T_1$ is off the transistor $T_6$ is energized at its emitter and thus also off. Thus the transistor $T_6$ is effective to change the time constant only when the transistor $T_1$ is on, that is during the interval between pulses. As a result the pulse length remains constant while the pulse interval changes. That is to say while the pulse is being generated the resistor $R_5$ is not being shunted. During the pulse interval the resistor $R_5$ is being shunted. Thus the pulses which are needed to energize the pump P remain their full length at all times while the pulse interval changes.

This specification, in discussing current to and from the capacitor C when the point B rises to the positive value of the source $S_1$, speaks of the capacitor as changing its charge. This terminology is used because the capacitor C may be considered as both charging and discharging at the same time or almost immediately in sequence.

An example of the invention being embodied in other types of pulse generators would be to take the transistor $T_6$ and the resistor $R_{10}$ and apply it across the collector resistor of one transistor in a simple collector-coupled astable multivibrator. The resistor $R_9$ and the diode $D_2$ would then be connected from the base of the transistor $T_6$ to one or the other leads of the supply to the multivibrator.

While embodiments of the invention have been described in detail and will be obvious to those skilled in the art that the invention may be embodied otherwise without departing from its spirit and scope.

What is claimed is:

1. A circuit comprising a pair of leads carrying a difference of potential, semiconductor amplifier means connected to one of said leads, said amplifier means having a control element, switching circuit means connected to said control elements of said amplifier means for controlling said amplifier means, timing circuit means connected to the output of said amplifier means and to said switching circuit means for controlling said switching circuit means in response to operation of said amplifier means, said timing circuit means including resistance means and capacitance means, second semiconductor amplifier means connected in parallel across said resistance means and having a control element, and constant voltage means connecting said control elements of said second amplifier means to the other of said leads and responsive to energizing current, said second control element floating otherwise relative to the one of the leads, said constant voltage means being connected in series with said first amplifier means and said second control element for receiving substantially all of the energizing current through said first amplifier means.

2. A circuit as in claim 1, wherein said constant voltage means includes a Zener diode.

3. A circuit as in claim 1, wherein said first amplifier means includes a transistor amplifier having an emitter-collector circuit in series with said resistance means.

4. A circuit as in claim 1, wherein said second amplifier means includes a transistor device having an emitter-collector path forming at least part of a network shunting said resistance means.

5. A circuit as in claim 1, wherein said second amplifier means includes a transistor device having an emitter-collector path and a resistor series connected with said emitter-collector path and forming with the emitter-collector path a network shunting said resistance means.

6. A circuit as in claim 3, wherein said second amplifier means includes a transistor having an emitter-collector path forming part of a shunt across said resistance means.

7. A circuit as in claim 1, wherein said constant voltage means includes a Zener diode and a resistor connected in series with said Zener diode and together connecting the control element on said second amplifier means to the other of said leads.

8. A circuit as in claim 7, said second amplifier means including a resistor and a transistor having an emitter-collector path in series with said resistor, said resistor forming with the emitter-collector path a network shunting said resistance means.

9. A circuit as in claim 8, wherein said first amplifier means includes a transistor having an emitter-collector path in series with said resistance means.

10. A circuit, comprising a pair of leads carrying a difference of potential, time dependent circuit means connected to said leads, said circuit means including a time constant circuit having two time determining elements, switch means coupled to one of said elements and being cycled on and off by operation of said circuit means, amplifier means having a main path of current flow shunted across said one of said elements, said amplifier means having an impedent and a control electrode, said amplifier means otherwise floating relative to said leads, constant voltage means connected to the control electrode of said amplifier means, said constant voltage means being coupled to said leads and to said switch means for turning on said amplifier means and shunting the one of said elements in response to the condition of said switch means and the potential difference between said leads.

* * * * *